T. I. POTTER.
CALCULATING MACHINE.
APPLICATION FILED NOV. 20, 1911.

1,035,101.

Patented Aug. 6, 1912.

8 SHEETS—SHEET 1.

WITNESSES
Thomas Durant
Halbert P. Brown

INVENTOR
Thomas Irving Potter
By Church & Church
His ATTORNEYS

T. I. POTTER.
CALCULATING MACHINE.
APPLICATION FILED NOV. 20, 1911.

1,035,101.

Patented Aug. 6, 1912.
8 SHEETS—SHEET 4.

WITNESSES

INVENTOR
Thomas Irving Potter
By
HIS ATTORNEYS.

T. I. POTTER.
CALCULATING MACHINE.
APPLICATION FILED NOV. 20, 1911.
1,035,101.
Patented Aug. 6, 1912.
8 SHEETS—SHEET 5.
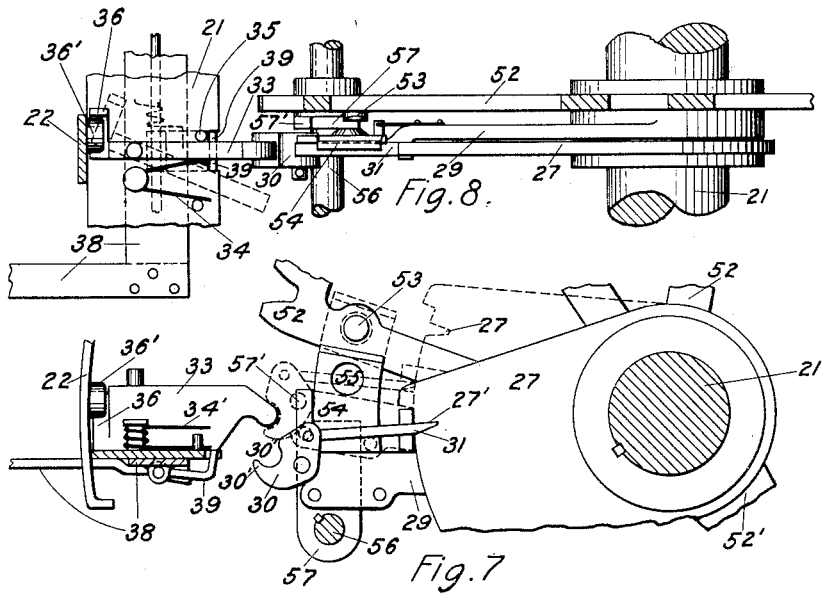
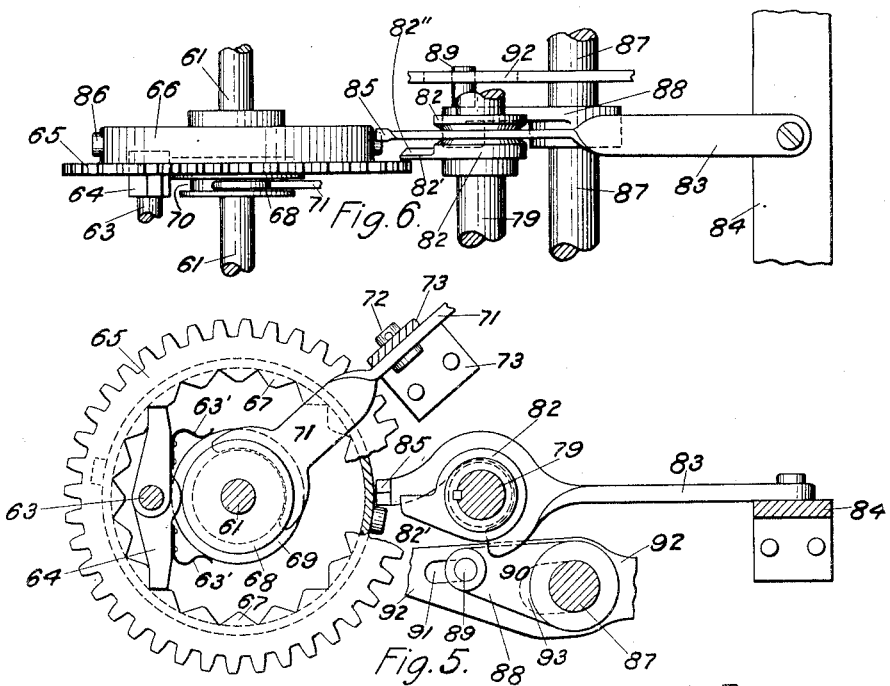

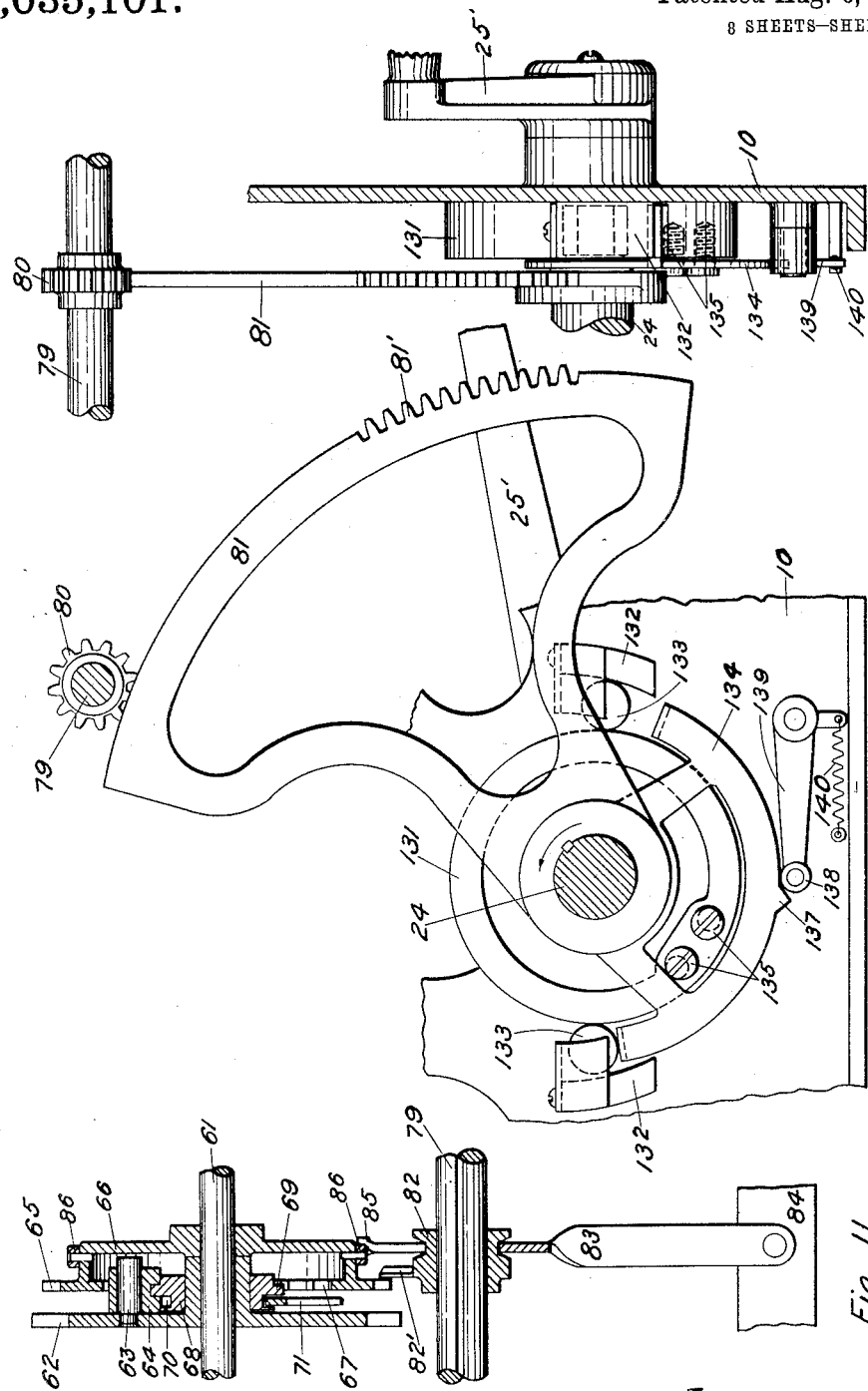

T. I. POTTER.
CALCULATING MACHINE.
APPLICATION FILED NOV. 20, 1911.

1,035,101.

Patented Aug. 6, 1912
8 SHEETS—SHEET 7.

WITNESSES
Thomas Durant
Halbert P. Brown

INVENTOR
Thomas Irving Potter
By Church & Church
HIS ATTORNEYS

UNITED STATES PATENT OFFICE.

THOMAS IRVING POTTER, OF PORTLAND, OREGON.

CALCULATING-MACHINE.

1,035,101.  Specification of Letters Patent.  Patented Aug. 6, 1912.

Application filed November 20, 1911. Serial No. 661,292.

*To all whom it may concern:*

Be it known that I, THOMAS IRVING POTTER, a citizen of the United States, residing at Portland, in the county of Multnomah and State of Oregon, have invented certain new and useful Improvements in Calculating-Machines; and I do hereby declare the following to be a full, clear, and exact description of the same, reference being had to the accompanying drawings, forming part of this specification, and to the figures and letters of reference marked thereon.

This invention relates to calculating machines, and is primarily designed as an improvement upon that type of calculating machine adapted to perform the operations of addition or subtraction in a rapid and accurate manner, and requiring in its manipulation simply that the numbers to be added or subtracted shall be set up in a suitable key-board and an operating handle moved through one excursion, the optional character of the operations of the machine, that is to say, whether the number is to be added or subtracted or multiples of it added or subtracted, being also under the control of the operator through the manipulation of suitable keys in the key-board.

The objects of the invention are to provide a machine having comparatively few parts of such character as to adapt them for ready manufacture by simple machinery, and which when assembled shall not require that close accurate adjustment and fit which has heretofore made the cost of machines of this character excessive.

Figure 1:
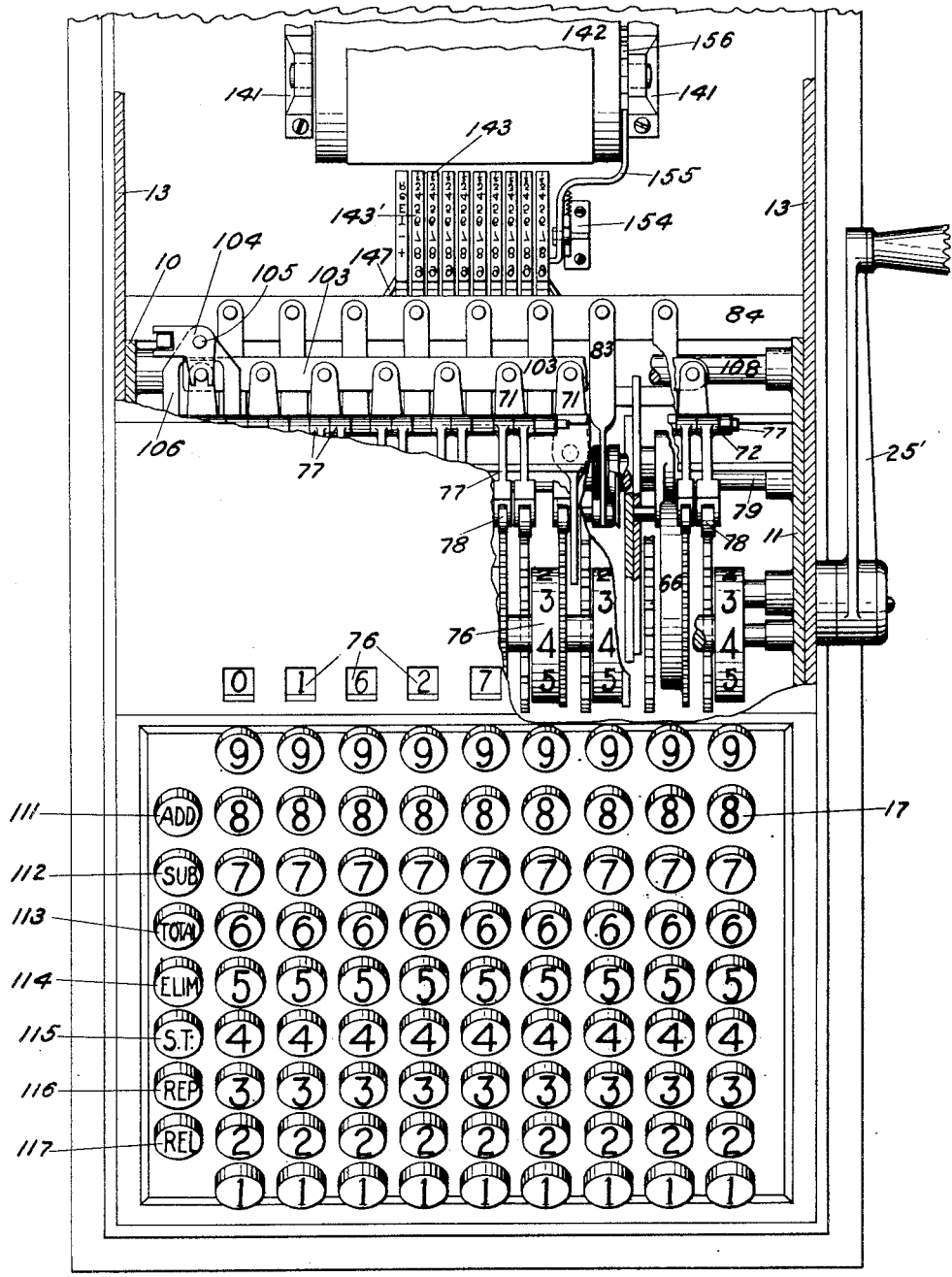
Figure 2:
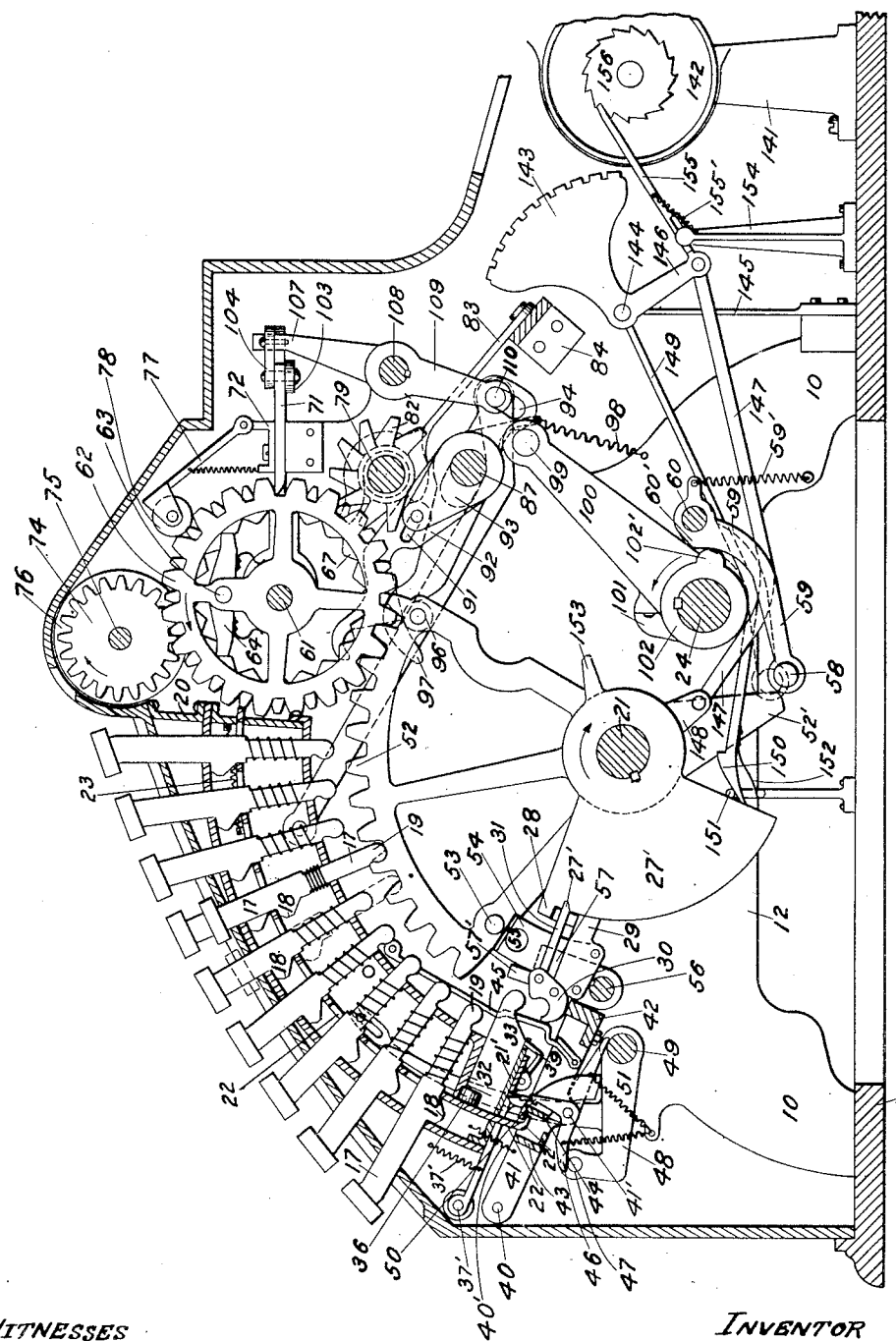
Figure 3:
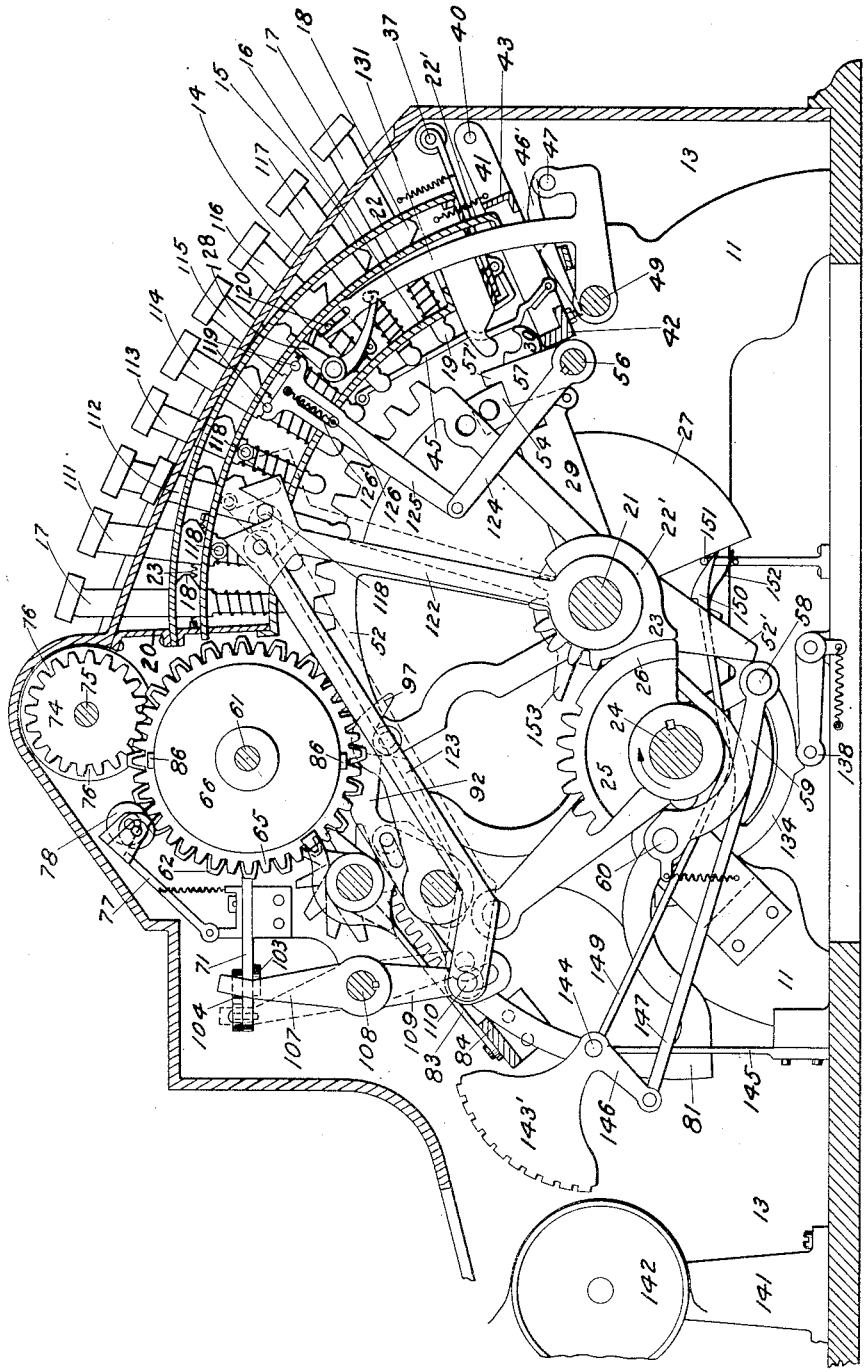
Figure 4:
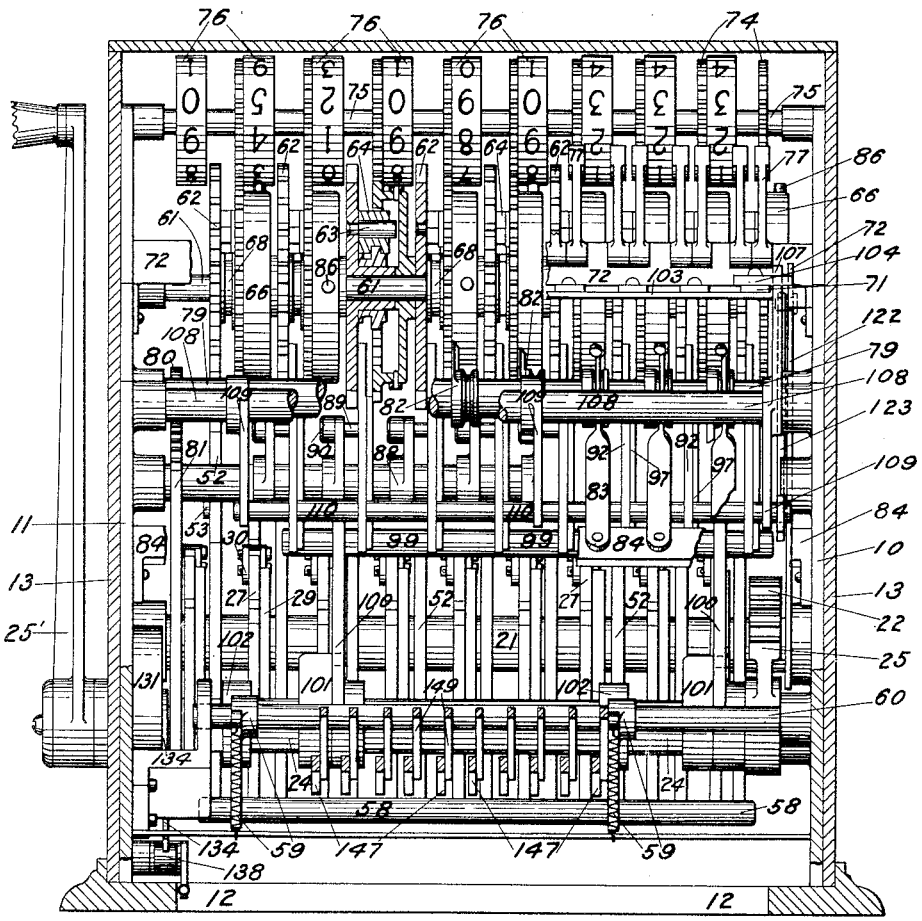
Figure 15:
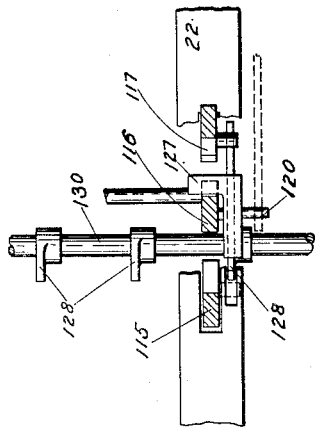
Figure 14:
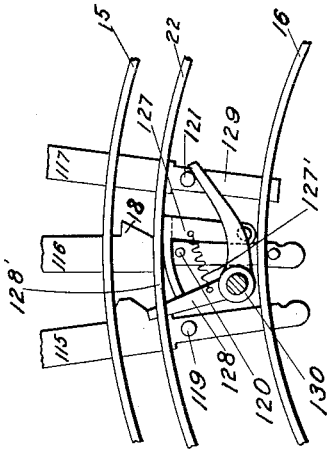
Figure 13:
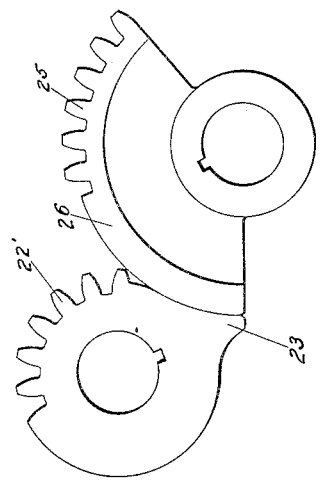
Figure 12:
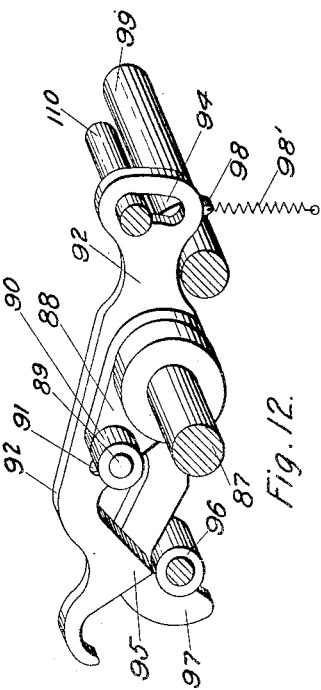
Figure 16:
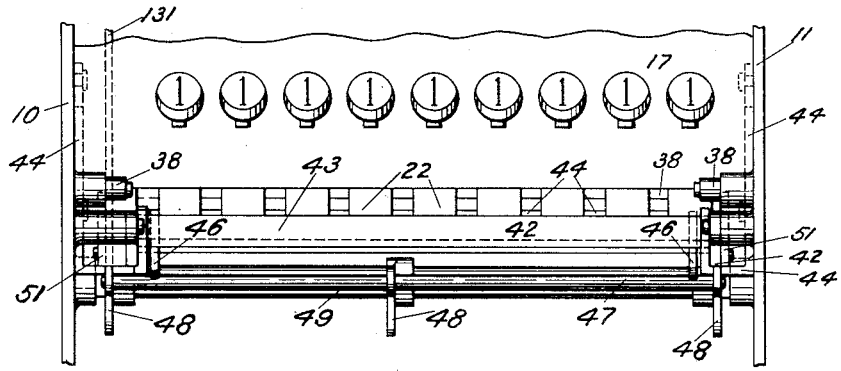
Figure 17:
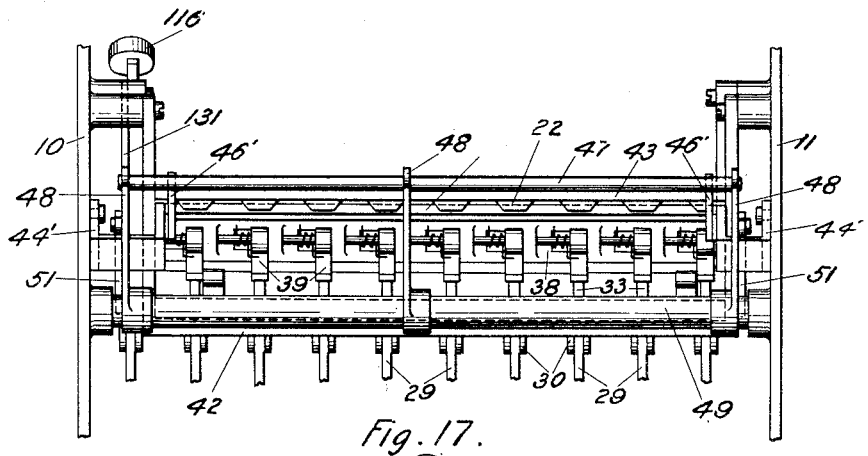
Figure 18:
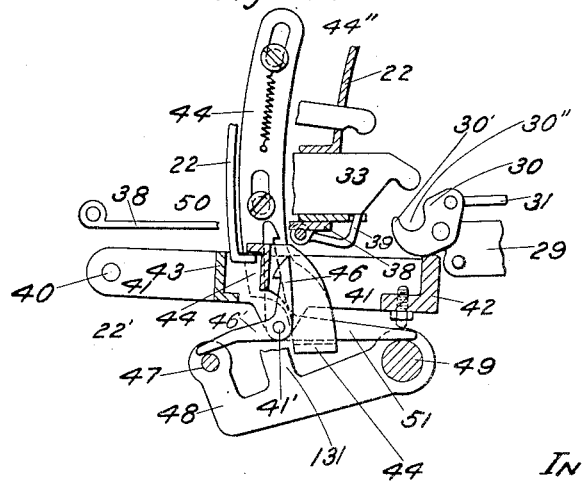

Referring to the accompanying drawings illustrating one form of a machine embodying the present improvements, but which, it will be understood, is only typical of the machines to which the improvements may be applied,—Figure 1 is a top plan view with portions of the casing removed and some of the underlying parts shown broken away and in section; Fig. 2 is an elevation looking at the right hand side of the operating mechanism of the machine with the casing and some of the interior parts in section; Fig. 3 is a view corresponding to Fig. 2, but taken from a point of view on the opposite side of the machine from Fig. 2; Fig. 4 is a rear elevation with the casing in section and some of the interior parts of the mechanism broken away and in section; Fig. 5 is a detail view on an enlarged scale, showing in elevation and partial section parts of the carrying mechanism, whereby the indicating wheel of higher denomination is operated by mechanism controlled by an indicating wheel of lower denomination; Fig. 6 is a top plan view of the parts shown in Fig. 5; Fig. 7 is a detail view on an enlarged scale showing in elevation and partial section one of the gear segment operating arms, its dog and operating segment, together with a zero stop; Fig. 8 is a top plan view of the mechanism shown in Fig. 7; Fig. 9 is an elevation on an enlarged scale of the intermittent gearing for operating the carrying mechanism, and the full stroke mechanism for insuring a complete excursion of the operating handle; Fig. 10 is a sectional elevation of the mechanism shown in Fig. 9; Fig. 11 is a sectional plan view of the mechanism shown in Figs. 5 and 6 with certain of the parts omitted; Fig. 12 is a detail view showing in perspective a portion of the mechanism for effecting the carrying operation in either adding or subtracting, the lever 92 in this figure being shown with portions broken away in Figs. 5 and 6; Fig. 13 is a detail view looking at the opposite side of the intermittent operating gears shown in Fig. 3; Fig. 14 is a detail elevation of the mechanism for tripping the repeat key by the operation of the release key; Fig. 15 is a plan view with parts in section and broken away of the mechanism shown in Fig. 14; Fig. 16 is a detail view showing in front elevation the lower keys of the key-board and mechanism for controlling the setting and releasing of the keys; Fig. 17 is an inverted plan of the parts shown in Fig. 16; and Fig. 18 is a sectional view taken in a vertical plane through the mechanism shown in Figs. 16 and 17, but with many of the parts omitted and some of the parts broken away to show parts which would be concealed thereby.

Like letters of reference in the several figures indicate the same parts.

The machine shown in the drawings for the purpose of illustrating the present invention embodies in its general construction a key-board having keys with finger pieces arranged in rows and numbered in each row successively from 1 to 9, there being in the machine a number of rows which correspond to the number of digits found in the largest number which can be added or subtracted. In the machine illustrated there are nine rows of keys and consequently the machine is competent to handle numbers up to 999,-999,999. The number to be added or subtracted is set up in the key-board by depressing the appropriate keys, said keys being retained in their depressed position during the operative movements of the machine, and serving to control the operating mechanism in such wise that it will transfer to the answer or indicating wheels movements in proportion to the movements permitted by the depressed keys. As a general proposition, machines adapted to obtain similar results by substantially the same manipulation as that just described are known in the art and the present invention relates more particularly to the details of construction and combinations and arrangements of the parts whereby the operating mechanism is simplified and the advantages heretofore referred to obtained.

The frame of the machine consists generally of two side members 10 and 11 mounted upon a base 12 and inclosed by a casing indicated generally by the numeral 13. Between the upper forward portions of the side frames 10 and 11 and secured thereto and to the casing are three curved plates 14, 15 and 16, best seen in Figs. 2 and 3, having radially arranged guide slots or openings therein through which pass the stems 17 of the keys which at their outer ends are provided with the finger pieces and numbers indicating their value. The inner ends of the keys 17 are rounded to coöperate with locking dogs to be presently described and project in rows arranged generally in a radial direction about a center which may be roughly indicated by the shaft 21 in said Figs. 2 and 3. The keys are adapted to be pressed outwardly by springs, as is usual in this type of key-board arrangement, and each key is formed with a transverse projection 18 having a lower inclined face and an upper shoulder coöperating with a locking bar 22. Each row of keys is provided with its own independent locking bar adapted to be held in operative position by a spring 23 and to be displaced longitudinally by the passage of the projection 18 of any key of the group or column whereby, when so displaced by the depression of the key, any other previously operated key of the row will be released, the said locking plate serving, when in position above the projection 18, to hold the key projected inwardly or depressed as shown, for instance, in Fig. 2, where the fourth key from the upper end of the first group is in its operated position.

The shaft 21, before referred to, is journaled in the side frames 10 and 11 and constitutes the actuating support for a series of operating segments 27 which are rigidly secured to the shaft; a series of operating arms 29 journaled on the shaft and a series of gear segments 52 also journaled on the shaft, there being one operating segment, arm and gear segment for each row of number keys in the key-board and an additional operating segment arm and gear segment, for a row of keys which are adapted to set the machine for adding, subtracting, totalizing, repeating, etc., as will be hereinafter explained. The operating segments, arms and gear segments for each row of keys are arranged in operative relation to each other, that is to say, side by side, and it is usually convenient to journal the arms and gear segments on the hubs of the operating segments, although this is optional and forms no part of the present invention. Each operating segment 27 is provided with a peripheral concentric surface at one end of which there is a notch or recess 27' and a projection 28 (see Fig. 2). The recess is adapted for the reception of the inner end of a pawl 31 pivotally connected at its outer end to a dog 30 pivoted on the outer end of the operating arm 29, the arrangement being such that the pawl is moved radially into and out of its recess by the pivotal movement of the dog on the arm, with the result that when the pawl is seated in its recess the arm and segment are locked together for unitary movement, and when the pawl is withdrawn from its recess the segment may advance independently of the arm, and by the engagement of the end of the pawl with the concentric periphery of the segment the dog is held against reverse pivotal movement on the arm.

The outer portion of each dog is provided with an extension 30', forming a seat or concavity 30" adapted to receive the rounded end 19 of any one of the keys 17 in its group of keys, and when said dog is turned on its pivotal center by engagement with a key, so as to withdraw the pawl from the recess 27' the arm and key will be firmly locked together and held until the operating segment again returns to a position where the pawl may enter its recess. This operation will be readily understood from Fig. 7, where one of the dogs is shown in dotted lines in its position of engagement with the zero stop, which latter has a rounded end corresponding to the inner ends of the keys.

From the foregoing it will be clear that when a key of a row is pressed inwardly, and the shaft 21 turned in a direction to advance the operating segment and arm locked thereto, the dog will be moved into engagement with the end of the key locked thereto, and the segment may proceed in the same direction, leaving the arm in fixed position, where it will remain until the segment again returns to a position where the pawl 31 may enter its recess 27' at which time the projection 28 on the segment strikes the arm 29 and through the engagement of the key with the dog, swings the dog back to its normal position and locks the same to the operating segment for return to initial position.

The arms 29 are utilized as the means whereby the gear segments 52 are moved angularly a distance determined by the operated key of a row, and for reasons which will hereinafter appear in connection with the carrying mechanism, a latch or catch mechanism is interposed between each operating arm and its gear segment, which latch is normally released or out of engagement with the gear segment, but moves into engagement and becomes locked thereto during the initial movement of the arm. This latch mechanism is best seen in Figs. 7 and 8 and embodies a spring pressed catch plate 54 mounted on the arm 29 and having near its outer end an aperture 55 adapted to receive a pin 53 carried by the gear segment 52. During the initial movement of the arm 29 from the position shown in full lines, Fig. 7, to the position shown in dotted lines, the latch plate 54 moves up over the pin 53 and snaps into position so as to securely lock the arm and gear segment together. When the parts return to normal position shown in full lines in Fig. 7 and just before the arm 29 reaches such position, the catch plate 24 passes in behind an arm 57 carried by a transverse shaft 56 being thereby moved transversely so as to release the pin 53 allowing the gear segment 52 to come to rest while the arm continues its movement for a short distance or until it reaches its initial position shown in full lines. The arm 57 is provided with a projection 57' which, when the arm is moved toward the catch, will hold said catch out of engagement with the pin 53, thereby preventing the operation of the gear segment, as is desirable in the performance of certain operations of the machine to be hereinafter referred to. There is an arm 57 on shaft 56 for each of the gear segments and the shaft is operated by the eliminate and sub-total keys 114 and 115 (Figs. 1 and 3) through a push bar 125 and crank arm 124. The push bar engages pins 119 on said keys and is limited in its movement by a pin 126 to which a return spring 126' may be connected.

In case no key of a row has been depressed, it is of course necessary to arrest the movement of the operating arm for that row before the gear segment is operated, and for this purpose there is provided at the bottom of each row of keys a part which might be termed a "dummy key," but which I preferably term a "zero stop." This zero stop is indicated by the reference number 33, and in addition to its rounded inner end with which the dog 30 coöperates, it is provided at its outer end with an incline 36 whereby it may be swung laterally against the tension of its spring 34, whenever a key of the row has been actuated. The incline 36 is in position to coöperate with a roller 36' mounted on the inner side of the locking bar 22, whereby, whenever the locking bar is depressed by the actuation of a key, the roller 36', engaging the incline 36, will swing the zero stops laterally out of the path of the dog 30 or to the position indicated in dotted lines in Fig. 8. To hold the zero stop in such position, a spring pressed latch 39 pivotally mounted on a bar 38 normally rests against the under edge of the zero stop, but when said stop is swung laterally as above described, the latch springs upwardly at one side of the zero stop and holds the same in the position indicated in dotted lines in Fig. 8, until the latch is withdrawn by the depression of the bar 38. Said bar 38 supports the latches for all of the zero stops and is carried on the ends of arms which are pivotally mounted at 37 in the walls of the casing. It is normally held up in the position shown in Figs. 2 and 7 by a spring 37' and is adapted to be drawn downwardly so as to release the zero stop latches by a hook-shaped catch 50 (Fig. 18), pivotally mounted on a rocking frame 41 pivoted at 40 in the casing and adapted to be depressed by the engagement of the dogs 30 with the angle bar 42 forming the edge of the rocking frame. The catch 50 is released from the bar 38 by the contact of its angle extension 51 with a transverse shaft 49 as will be readily understood from Fig. 18.

In addition to the catch 50 the rocking frame 41 is provided with a catch or latch 46 adapted to engage and depress or draw down a transverse angle bar 44 forming a part of a sliding frame supported by arms and screws 44' and 44'' at the sides of the casing, said angle bar 44 being adapted to coöperate with the lower inturned ends 22' of the locking bars 22, whereby the final movement of the operating arms and dogs will cause the locking bars to move downwardly and thereby release all of the actuated keys. The latch 46 is released from the bar 44 by the engagement of its right angle end 46' with a transverse bar 47 mounted in a frame 48 pivotally supported by the shaft 49. An arm 131 on the pivoted frame 48 extends upwardly into position for its bifurcated end to coöperate with a pin 120 mounted in a key 116, conveniently termed the repeat key. When the key 116 is depressed, the catch release bar 47 is elevated, the catch 46 held out of engagement with the bar 44, and the actuated keys will therefore not be released and a second operation may be performed to add or subtract a number corresponding to that previously added or subtracted. The latches 46 and 50 are so arranged or timed that in the normal operation of the machine or when not set to repeat, the latch 46 releases before the latch 50, so as to permit roller 36 to leave the incline or cam surface on the zero stop before the latter is released by the latch 50.

The frame 41 is normally held up by a spring 40' (Figs. 2 and 3), but in order to constitute a lock which will prevent the depression of the keys after the movement of the operating mechanism has been inaugurated, or during the actual operation of the gear segments, the said frame is provided with a longitudinal bar 43, which is adapted to underlie the lower ends of the locking bar 22, and when the frame is in its elevated position, to prevent the depression or longitudinal movement of said bars, which is necessary in the actuation of the keys controlled by the bar. Inasmuch as the spring would not alone be effective to support the frame 41, a latch or pair of latches is provided for holding the frame in its elevated position until released by the return of the operating arms and dogs to their initial positions. These latches are pivotally mounted on the side frames and are indicated by the reference number 45 in Figs. 2 and 3. In the position shown in Figs. 2 and 3 they have been engaged by the dogs 30 and swung into their releasing position, but during the initial operation of the parts the dogs 30 ride out of engagement with the latches 45, and as the front bar 42 of the frame 41 rises it is caught and held firmly in its elevated position by the said latches 45 and can not be again depressed until the dogs nearly reach their initial position on their return movement.

Oscillatory movement is imparted to the shaft 21 by intermittent gearing (Figs. 3 and 13) between said shaft and a shaft 24 to one end of which an operating handle 25' (Figs. 1 and 10) is affixed. The intermittent gearing embodies a segment 25 on the shaft 24, having one portion of its periphery smooth and concentric and another portion formed into gear teeth adapted to mesh with the gear teeth on the gear segment 22' keyed to the shaft 21. The segment 22' is provided with a smooth projection 23 which interlocks with the smooth portion 26 of the segment 25 so as to lock the shaft 21 against movement in either direction during the initial movement of the shaft 24, or until the shaft 24 has advanced a distance sufficient to bring the teeth of the respective segments into mesh.

Each of the gear segments 52 is in mesh with a corresponding gear wheel 62, journaled on a shaft 61 and adapted to transmit rotary movement in one direction or the other to gear wheels 65, also journaled on the shaft 61 and meshing with gear wheels 74 on shaft 75. The gear wheels 74 are formed as a part of or carry drums 76, constituting the answer wheels, and having appropriate numbers on their peripheries corresponding to the numbers of the finger pieces in the key-board. The gear wheels 62 and 65 are held in the positions to which they may be adjusted by spring pressed rollers 78 bearing on their peripheries and preferably mounted on pivotal carriers 77 (Figs. 2 and 3) said rollers however permit of the movement of the wheels when actuated and insure the proper positioning of them to fully expose the numbers on the answer wheels at the sight openings, as shown in Fig. 1.

For communicating motion from the gear wheels 62 to the gear wheels 65, the gear wheels 65 are provided with internal ratchet teeth 67 with which there is adapted to engage one or the other of the reversely arranged ends of pawls 64 each pivotally mounted at 63 on one of the web arms of the gear wheels 62. The reversely arranged ends of each pawl 64 are in different planes transversely of the axis of pivot 63 and the pawl is movable longitudinally of the axis, whereby when it is moved in one direction one pawl end will be thrown into engagement with the ratchet teeth 67 for moving the gear wheel 65 in one direction, and when in the other position longitudinally of its axis, the oppositely arranged end of the pawl will be thrown into engagement with said ratchet teeth 67 for moving the gear wheel 65 in the opposite direction. For moving the pawl longitudinally of its axis, it is provided with a slot 64, Fig. 11, in which a fin 69 on a shifting sleeve 68 is adapted to work, and said shifting sleeve 68 is provided with a peripheral groove 70 in which the forked end of a shifter lever 71 operates, as will be readily understood from an inspection of Figs. 5 and 11. The pawl is held in its operative position of adjustment by friction spring 63', and its ends are preferably so arranged with relation to the ratchet teeth 67 that one end moves into engagement with said teeth slightly before the opposite end moves out of engagement therewith, thereby maintaining the proper operative relation between the gear wheels 62 and 65. The gear wheel 62 being constantly in mesh with the gear segment 52 will be oscillated in accord with the oscillation of the gear segment. As a consequence, the gear wheel 65 will be rotated in one direction or the other depending upon which end of the pawl is in operative engagement therewith, said pawl riding idly over the internal ratchet teeth during the reverse movement of the gear wheel 62.

All of the shifters 71 are pivotally mounted on a fixed bar 73, and at their rear ends are connected by a long link 103, (Figs. 1 and 2) adapted to be moved in one direction or the other by keys which will indicate that the operation is to be one of addition or of subtraction. The "add" and "sub" keys in the key-board are indicated by the reference numbers 111 and 112, and in Fig. 3 it will be seen that each is provided with a transverse roller or pin 118 adapted to coöperate with oppositely directed inclines on the end of an arm 122 journaled on the shaft 21. The arm 122 is connected by a link 123 with a rod 110 mounted in the ends of arms 109 keyed to a shaft 108. The shaft 108 is journaled in the frame and provided at one end with an upwardly extending arm 107, the end of which enters the bifurcated end of one arm of a bell crank lever 104 journaled on bracket from the main frame at 105. The opposite arm of the bell crank lever 104 coöperates with the long link 103 for moving the shifters 71 in the manner before stated. Upon the depression of one or the other of the keys 111 and 112, the said shifters will be moved in one direction or the other. As shown in Fig. 3, the key 112 has been depressed, thereby shifting the parts to a position for performing the operation of subtraction. This operation is usually performed by the return movement of the gear segments 52, while the operation of addition is performed by the forward movements of said segments.

To provide for the operation of carrying from a number wheel of lower denomination, to a number wheel of higher denomination and for reverse carrying in performing the operation of subtracting, provision is made whereby the gear wheels and segment of a higher denomination are moved in one direction or the other when the wheel of the next lower denomination passes from 9 to 0, or vice versa without any direct connection intermediate the gear or number wheels.

As before pointed out, when the parts are in their normal or initial positions the gear segments 52 are released from their engagement with the operating arms and may, therefore, be moved in either direction independently of the arms. They are normally held against movement however by restraining arms 97 pivotally mounted on the transverse shaft 87 and having their ends formed to engage and center rollers 96 journaled on the inner edges of the gear segments. When in the position shown in Figs. 2, 3 and 12, the restraining arm 97 will hold the gear segment in its proper initial position, and said restraining arm is itself held by the engagement of its rear end 98 having an inclined face thereon with a transverse bar 99 mounted in the ends of arms 100 journaled on the shaft 24. The transverse bar 99 passes under the rear ends of all of the restraining arms, and when moved away from the axis of said arms, or to the position shown in Fig. 2, it forces the rear ends of the arms upwardly against the tension of the springs 98' and the forward ends down into position to center and restrain the gear segments. To move the arms and transverse bar to this position, the shaft 24 is provided with a hub 102 having a projection 101 thereon adapted to contact with one side of the arm 100 (see Fig. 2). Movement in the opposite direction is imparted to the arm 100 and transverse bar 99 by the action of the rear ends 98 of the restraining arms 97 which are normally pulled downwardly by the springs 98' as aforesaid.

Mounted on the shaft 87 beside each of the restraining arms 97 is a carrying arm 92. The said carrying arms have slot bearings indicated by dotted lines at 93 in Fig. 2, whereby they may be moved transversely of the shaft 87, and each at its forward end is provided with a V-shaped projection 95 forming oppositely directed inclined faces, as shown in Fig. 12. The projections normally occupy a position above the rollers 96, and if said carrying arms be shifted longitudinally in one direction or the other, and then depressed, it is obvious that the inclined faces coöperating with the rollers 96 will, when the segments are released, cause a movement of the gear segments in one direction or the other. The movement is so proportioned that it will impart to the answer wheels a movement necessary to advance or retract the same from one figure to the next.

For shifting the carrying arms so as to either advance or retract the gear segments and answer wheels, the rear ends of the shifter arms 92 are slotted at 94 and receive the transverse rod 110 which, as heretofore explained, is mounted in the ends of the arm 99 on the shaft 108 and is shifted back and forth by the alternate operation of the "add" and "sub" keys 111 and 112. When the subtract key is operated, the rod 110 is shifted rearwardly, thereby drawing the point of the projection 95 beyond the center of the roller 96 and when the shifter lever 92 is depressed by mechanism about to be described, the roller 96, together with the gear segment, will be moved reversely a distance sufficient to move the answer wheel reversely one number. The shaft 87 in addition to the restraining arms 97 and shifter arms 92 carries a corresponding number of crank arms 88, each having at its extremity a pin 89, one end of which passes through and works in a slot 91 in the adjacent shifter arm, and the opposite end of which carries an antifriction roller 90, best seen in Fig. 12, and in rear elevation in Fig. 4. The series of rollers 90 are in position to be operated upon and depressed thereby depressing the shifter arms, by a series of cams mounted on a transverse shaft 79. Said cams are indicated by the reference number 82', and in Figs. 2 and 3 it will be seen that they are arranged in a spiral series on the shaft 79, while from Figs. 5 and 6 it will be seen that each cam embodies a hub 82 keyed to the shaft but free to move longitudinally thereon for a limited distance and having an annular groove therein for the reception of the bifurcated end of a lever 83 pivotally mounted on a fixed bar 84. Each of the levers 83 projects forwardly of the shafts 79 and has at its end a V-shaped cam face 85 which is adapted to coöperate with a roller or stud like projection 86 on the dish-shaped mounting 66 of one of the gear wheels 65. The inclines or cam faces of the levers 83 normally lie in the path of the rollers or projections 86, whereby the said levers will be deflected by the passing of the rollers during the rotation of the gear wheels, and when so deflected will shift the carrying cams 82' longitudinally of the shaft. When so shifted, the carrying cams will travel in paths intersecting the rollers 90 and will depress the arms as before described. The upper edges of the cams 82' are beveled at 82" and are adapted to coöperate with corresponding inclines on the edges of the rollers 90 during the reverse rotation of the shaft 79. The shaft is rotated in one direction to perform the carrying operation and in the opposite direction to shift the same longitudinally of the shaft 70 back to their initial positions.

In the preferred construction each of the housings 66 of the gear wheels 65 is provided with two rollers or projections 86 and the proportioning of the gearing is such that a half revolution of a wheel 65 will rotate its answer wheel a full revolution, this construction resulting in a corresponding simplification of the gearing and reduces the wear and tear on the machine.

The shaft 79 is rotated forwardly and backwardly intermittently, or at the proper intervals by an intermittent gearing intermediate said shaft and the shaft 24. This intermittent gearing is shown in detail in Figs. 9 and 10 and embodies a mutilated pinion 80 on the shaft 79 and a relatively large segment 81 on the shaft 24, said segment having a smooth concentric peripheral portion for normally locking the shaft 79 against rotation and a rack or toothed section 81', which meshes with the pinion 80 and rotates the same forwardly through a complete revolution and then backwardly to its initial position, this rotation taking place in one direction during the first part of the movement of the shaft 24 or in other words, during the time that the intermittent gears 22' and 25 are in locking position and no motion is being transmitted from the shaft 24 to the shaft 21, but the movement of the shaft 79 is not inaugurated until the arms 100 and rod 99 have been allowed to move out of their locking engagement with the ends of the restraining arms 98.

The gear segments 52 in the normal operation of the machine are arrested in their proper initial positions by a transverse bar 58 against which the downwardly extending projections 51' of the gear segments may find a seat when said bar is in its elevated position indicated in dotted lines in Fig. 2. This bar 58 is mounted in the ends of arms 59 journaled on a shaft 60 and normally held up by a spring 59', but adapted to be depressed by a projection 102' on the hub 102 carried by the shaft 24. The projection 102' engages the inclined face of the arm 59 just before the shaft 24 reaches its initial position and rides out of engagement with the said arm 59 immediately after the shaft begins its excursion, the object of the construction being to provide an effective stop for the gear segments and at the same time to free said segments during the time that the carrying operations are to be performed, at which time the segments may have to be moved either forwardly or backwardly, depending upon which of the operations of adding or subtracting is being performed.

For making a record of the operations performed by the machine there is provided a series of type segments 143, one segment for each of the vertical rows of keys and an additional segment 143' for the control keys at the left of the key board. All of the type segments are pivotally mounted on a resilient support for upright 145 and each is connected through a bell crank arm 166 and link 147 with a downwardly projecting arm 148 on an operating arm 29 whereby the segment and answer wheel are set simultaneously. The proportioning of the parts is such that the segment will present at the printing point on a roller 142, a character which corresponds to that displayed through the sight opening by the answer wheel. In order to take the impression, the pivot 144 of the type segments is provided with a link 149 extending inwardly beneath the shaft 24 and having at its inner end a hook or shoulder for the engagement of a projection 153 on one of the operating segments 27. The hook on the end of the link 149 is normally held up in operative position by a spring 152 and is provided with an inclined face 150 adapted to engage a fixed projection 151 whereby, as the operating segment 27 is advanced the projection 153 will first engage the hook or shoulder, thereby moving the pivot or upper end of the support 145 away from the platen 142 until the incline 150 causes the disengagement of the hook and projection 153, allowing the type segments to advance under the resilient action of their support 145 so as to strike the predetermined characters against the papers supported on the platen 142. Of course, any of the usual inking arrangements or ribbon supports may be employed in connection with the type segments to give the desired impression. For automatically rotating the platen 142 it is provided at one end with a ratchet wheel 156 on which rests one end of a sliding pawl 155. The sliding pawl is retracted by a spring 155' and its rear end lies in position to be struck by the bell crank arm 146 of one of the type segments when the latter returns to its initial position shown in Fig. 2, thereby rotating the platen a distance corresponding to one of the teeth of the ratchet wheel.

The shaft 24 is provided at one end with an annular flange or drum 31 (Figs. 9 and 10) and journaled upon the shaft in proximity to the drum is a swinging segment 134 adapted to be moved across a center by screws 135 engaging the end arms of the segment. The segment is held in either position to which it may be moved by a roller 138 coöperating with a projection 137 on the segment. Said roller 138 is mounted on an arm 139 adapted to be advanced by a spring 140. When the shaft is at the opposite extremes of its movement it will have moved the segment sufficiently far to shift the projection 137 past the roller in one direction or the other, thereby holding one or the other of the extremities of the segment elevated. The extremities of the segment constitute elevating devices for clutch members 133 adapted to work between inclines 132 and the periphery of the drum 131. The clutch members 133 are the loose members, usually in the form of rollers, and are oppositely disposed and arranged so as to, unless lifted and supported by the segment, prevent the rotation of the shaft in but one direction. With the parts in the position shown in full lines in Fig. 9, the left hand clutch member is supported by the segment, while the right hand clutch member 133 is in operative position and will only permit the shaft to rotate in the direction indicated by the arrow. Just as the shaft reaches the extreme of its throw in that direction, the segment 134 will be shifted so as to drop the left hand clutch member into operative position and elevate or support the right hand clutch member, after which the shaft can only be rotated in the reverse direction to that indicated by the arrow. By this arrangement the manipulation of the machine to secure a false result is prevented and injury to the operating parts cannot occur by reason of the shaft being rotated in the wrong direction.

In order to provide for the releasing of any or all keys which may be incorrectly set up in the key board, a release key 117 is provided, which release key, as shown in Figs. 14 and 15, has no projection for coöperating with the lock bar 22, and no rounded inner end for coöperation with the dog of the operating arm, but at one side it is provided with a pin 121 adapted to bear on an arm 129 projecting forwardly from a shaft 130 journaled in the side frames and extending across the key board between the stems of the keys. The shaft 130 is provided with a series of arms 128, one projecting through each of the locking bars 122, whereby upon the depression of the key 117 all of the locking bars will be moved downwardly and any and all keys held thereby released and permitted to return to their normal position.

Under certain circumstances it is desirable to provide for the repetition of an operation performed by the machine; thus, the addition or subtraction of the same number more than once may be desired, and this is accomplished, as hereinbefore described, by the depression of the key 116. The key 116, however, is not adapted to be retained in its depressed position by the locking bar 22 for its row of keys, but is provided with a projection 18ª, Fig. 14, which passes down under a pivoted locking dog 127, as shown in Fig. 15. The pivoted locking dog 127 is held up to its working position by a spring 127', and at one edge carries an arm 128', normally resting against one of the arms 128, whereby upon the depression of the release key 117 the repeat key 116 will also be released. This arrangement provides against the repeat key being released in the normal operation of the machine so that the operation may be repeated as often as desired, for instance, in the operations of multiplying or dividing, and requires that the release key shall be operated before a different manipulation of the machine is undertaken.

A simple transaction with the machine may be briefly described as follows:—If one of the keys, say key No. 6 in the first or cents row, be depressed, as shown in Fig. 2 in full lines, its projection 18 passing through the slot in the locking bar 22, moves the roller 36 downwardly against the cam surface of the zero stop 33, thereby moving the inner end of the zero stop laterally out of the path of travel of the dog 30 on the operating arm, where it is retained by the pawl 39. If now the shaft 34 be rotated in the direction of the arrow, the projection 102' on collar 102, moves away from the arm 59 and the shaft 58 moves upwardly, as shown in dotted lines in said Fig. 2, to prevent any reverse movement of the gear segments, by forming a stop for the arms 52' on said segments. Simultaneously, the arm 100 is moved slightly to the left by the ends 98 of the restraining arms 97, and the latter rises out of engagement with the rollers 96 on the gear segment. The first tooth in segment 25 engages the pinion 22 and rotates the shaft 21, segment 27 and arm 29. The latch 54 engages the pin 53, thereby locking the operating arm and gear segment together and thus rotating the gear segment 52, gear 62 and, if the "and" key has been operated, the left hand end of the pawl 64 (Fig. 2), which latter engages and rotates the gears 65, 74 and the answer wheel 76 through six spaces, when the dog 30 latches itself upon the inner end of the depressed key. After this occurs, the segment 27 continues its travel at the end of its stroke, operating the printing mechanism and printing the figure 6 on the paper carried by the platen. The dogs on all of the operating arms for groups of keys in which no key has been operated will engage and lock themselves to the zero stops and consequently the gear segments for those arms will not be moved. On the return movement the extension 28 on the segment 27 contacts with the bent over portion of the arm 29 through which the pawl passes, the pawl 31 drops into the slot 37' thereby releasing the dog 30 from the key to which it has been attached. During such return movement the pawl 64 rides over the ratchet teeth 67 and the teeth in segment 81 (Fig. 9) rotate the shaft 79 through one revolution. The arms 52' contact with the bar 58 to thereby arrest the movement of the gear segment, the trip arm 57 unlatches the pawl 54 and the operating arm 29 returns to its initial position. Simultaneously the rod 58 is depressed by the rod 102' on the sleeve 102, and the restraining arm 97 is lowered onto the roller 96. The positioning of the rollers or projections 86 on the gear wheel mounting 66 is such that if the answer wheel 76 rotates during the operation from the 9 to 0 indication, one of the said rollers or projections passes the V-shaped incline 85 of the lever 83 thereby shifting the sleeve 82 and cam 82' to the right, as seen in Fig. 11, thus bringing the cam into a position where, when it is rotated counterclockwise, as viewed in Fig. 2, it will engage and depress the roller 90 and the arm 92, whereby the roller 96 and the gear segment on which it is mounted will be moved a proper distance to rotate the gears and answer wheels forwardly to bring the next succeeding number before the sight opening. In a succession of operations it is obvious that if the second or tens gearing has been brought into a position where its roller or projection 86 passes the V-shaped cam on the lever 83 pertaining thereto, a similar action will be effected on the answer wheel of next higher denomination. Under similar circumstances a corresponding action will be caused between the answer wheels and gearing of successively higher denomination.

In case the subtract key is depressed, as shown at 122 in Fig. 3, the arms 122, 109 and 107 will take the position shown in full lines in said figure, whereby the bushing 68 and pawl 64, (Figs. 5 and 11) are shifted to the right as viewed in said last mentioned figure, thereby throwing the right hand end of the pawl 64 into registry with the ratchet teeth 67 in the gear 65. If then the machine be operated as before, the gear 65 will not be moved during the forward motion of the handle 25' and gear segments, but during the return movement of these parts the pawl 64 rotates the gear 65 and answer wheel 76 in a reverse direction, the rollers 86 and arms 82' operate as previously described and six is subtracted direct from the amount indicated on the answer wheels. If it is desired to return all of the indicating or answer wheels to zero the total key 113 is depressed and the amount indicated on the dial is set up in the key-board. The operation of the handle will print and subtract this amount. In case a number is set up on a key-board which it is not desired to add on the dial, the eliminate key 114 or the sub-total key 115 is depressed, whereby the shaft 56 is rotated, a distance necessary to carry the extension 57' on the trip arm 57 (Fig. 7) into position to prevent a pawl 54 latching on the pin 53. The handle being operated, the amount set up on the key-board is printed, but the indicating dials are not moved. In case it is desired to add or subtract a stated amount two or more times successively, the repeat key 116 is depressed, whereby the arm 131 is operated, lifting the rod 47 whereby the pawl 46 is prevented from depressing the locking bar 22, the keys are not released and the amount set up on the key-board will be added to the amount already indicated by the machine. By depressing the release key the repeat and all other keys are released and returned to their initial positions.

Having thus described my invention, what I claim as new and desire to secure by Letters Patent of the United States, is:

1. In a calculating machine, the combination with the answer wheels and gearing for operating them, embodying oscillatory gear segments, of key set operating arms for the gear segments, normally uncoupled latches for connecting the arms and segments and a carrying mechanism for imparting movement to the segments independently of their operating arms.

2. In a calculating machine, the combination with the answer wheels and gearing for operating them, embodying oscillatory gear segments, of oscillatory operating arms for the gear segments, latches for connecting the arms and gear segments, means for uncoupling the latches, whereby the segments are permitted to move independently of the arms and carrying mechanism controlled by the gearing for the answer wheels of lower denominations for moving the gear segments of the answer wheels of higher denomination when uncoupled from the operating arms.

3. In a calculating machine, the combination with the answer wheels and gearing for operating them embodying oscillatory gear segments and operating arms normally uncoupled from said segments, of latches for coupling the arms and segments together, a carrying mechanism for moving the gear segments, when uncoupled from the arms, and a group of keys for determining the position of each operating arm.

4. In a calculating machine, the combination with the answer wheels, oscillatory gear segments for rotating the answer wheels and means for positively moving the gear segments in each direction, of reversely acting pawl and ratchet connections, intermediate the wheels and segments, and key controlled means for setting the pawl and ratchet connections whereby the answer wheels may be positively operated in either direction.

5. In a calculating machine, the combination with the answer wheels, oscillatory gear segments for rotating the answer wheels, oscillatory operating arms for moving the gear segments, oscillatory operating segments for moving the arms, latches interposed between the operating segments and arms and between the operating arms and gear segments, a group of keys controlling the latch intermediate each operating segment and arm, whereby the range of movement of the gear segment is controlled, and means for positively moving the operating segments in each direction, of reversely acting pawl and ratchet connections intermediate the wheels and gear segments, and key controlled means for setting the pawl and ratchet connections whereby the answer wheels may be positively operated in either direction.

6. In a calculating machine, the combination with the answer wheels, oscillatory gear segments for rotating the answer wheels, oscillatory gear segments, mechanism for separably locking the operating segments and gear segments together, key controlled stops for the gear segments, and means for positively oscillating the operating segments in each direction, of reversely acting pawl and ratchet connections intermediate the wheels and gear segments, and key controlled means for setting the pawl and ratchet connections, whereby the answer wheels may be positively rotated in either direction.

7. In a calculating machine, the combination with the answer wheels, oscillatory gear segments for rotating the answer wheels, means for positively moving the gear segments in each direction, reversely acting pawl and ratchet connections intermediate the wheels and segments, and key controlled means for setting the pawl and ratchet connections, whereby the answer wheels may be positively rotated in either direction, and a carrying mechanism controlled by said pawl and ratchet setting means for moving the gear segments in one direction or the other in accord with the direction of movement imparted to the answer wheels.

8. In a calculating machine, the combination with the answer wheels, oscillatory gear segments for rotating the answer wheels, means for positively moving the gear segments in each direction, embodying operating arms, latches connecting the arms and gear segments, means for uncoupling said latches, a group of keys for limiting the range of movement of each gear segment, reversely acting pawl and ratchet connections intermediate the wheels and segments and key-controlled means for setting the pawl and ratchet connections whereby the answer wheels may be rotated in either direction, of a carrying mechanism, and means for operating said carrying mechanism to move the gear segments when uncoupled from their operating arms.

9. In a calculating machine, the combination with a series of answer wheels, a series of groups of keys, one group for each answer wheel, a corresponding series of oscillatory segments, the range of movement of each segment being controlled by the keys of one group, and means for positively moving the segments in each direction, of reversely acting pawl and ratchet connections interposed between each segment and its answer wheel, and key controlled means for shifting the pawl and ratchet connections, whereby the answer wheels may be rotated in either direction.

10. In a calculating machine, the combination with a series of answer wheels and a series of groups of keys, one group for each answer wheel, of gearing intermediate the keys and answer wheels embodying wheels journaled on a common axis, ratchet teeth on one wheel and reversely acting pawls on the other wheel for coöperation with said ratchet teeth, and key controlled means for shifting the pawls whereby the answer wheels may be rotated in either direction.

11. In a calculating machine, the combination with a series of answer wheels, a series of groups of keys, one group for each answer wheel, gearing intermediate the keys and answer wheels embodying wheels journaled on a common axis, ratchet teeth on one wheel, and reversely acting pawls on the other wheel for coöperation with said ratchet teeth, and key controlled means for shifting the pawls whereby the answer wheels may be rotated in either direction, of a carrying mechanism controlled by the pawl shifting means for advancing or retracting the answer wheels in accord with the direction of movement imparted by the pawls.

12. In a calculating machine, the combination with a series of answer wheels and a series of groups of keys, one group for each answer wheel, of gearing intermediate the keys and answer wheels, embodying an oscillatory driving wheel and a rotary driven wheel, both journaled on a common axis, ratchet teeth on one wheel and a pawl having oppositely directed arms lying in different planes pivoted on the other wheel and movable longitudinally of its axis, a shifter lever associated with each pawl, a link connecting all of the shifter levers, and a key for moving said link whereby the pawls may be shifted to move the driven wheel intermittently in either direction.

13. In a calculating machine, the combination with a series of answer wheels, a series of oscillatory gear segments for rotating said answer wheels, means for positively moving said oscillatory segments in both directions, and a group of keys for limiting the range of movement of each gear segment, of reversely acting pawl and ratchet connections intermediate the gear segments and answer wheels, means for shifting said pawl and ratchet connections whereby the answer wheels may be rotated intermittently in either direction, a carrying mechanism embodying reversely arranged inclines for moving the gear segments in one direction or the other, and key operated means for simultaneously setting the said pawl and ratchet connections, and inclines whereby the carrying mechanism will operate to move the answer wheels in accord with the direction of movement imparted thereto by the pawl and ratchet connections.

14. In a calculating machine, the combination with the oscillatory gear segments, means for positively moving said gear segments in each direction, a group of keys for determining the range of movement of each gear segment, answer wheels, gearing interposed between said answer wheels and gear segments embodying oscillatory and rotary wheels mounted on a common axis, reversely acting pawl and ratchet connections between said oscillatory and rotary wheels, and shifter levers for said pawls whereby the answer wheels may be rotated intermittently in either direction, of a carrying mechanism embodying a pivoted arm movable transversely of its axis, and having oppositely directed inclines thereon, projections on the gear segments with which said inclines coöperate, and key controlled connections intermediate the pawl shifting levers and arm of the carrying mechanism whereby said arm will be moved transversely of its axis to bring one or the other of the inclines into operative position for moving the gear segments in accord with the direction of rotation imparted thereby to the answer wheels, and means to operate said arms for so moving the segments.

15. In a calculating machine, the combination with the oscillatory gear segments, answer wheels, oscillatory and rotary gear wheels intermediate said gear segments and answer wheels, pawl and ratchet connections intermediate said oscillatory and rotary gear wheels, and keys for limiting the range of movement of the gear segments, of a carrying mechanism embodying a pivoted arm having oppositely directed inclines thereon, projections on the gear segments with which said inclines coöperate, operating cams for said arms, connections intermediate the rotary gear wheels and operating cams for setting said cams in operative position, and driving mechanism for successively moving said cams and gear segments, substantially as described.

16. In a calculating machine, the combination with the answer wheels oscillatory gear segments, oscillatory operating arms, latches for coupling said arms and gear segments together, means for normally holding said latches in uncoupled position, keys for limiting the range of movement of the operating arms and gear segments, restraining arms for holding the gear segments when uncoupled from their operating arms, and driving mechanism for simultaneously moving the restraining arms to release the gear segments and the operating arms to engage said segments, of answer wheels, gearing intermediate said answer wheels and segments, and a carrying mechanism coöperating with the segments when uncoupled from their operating arms, said carrying mechanism embodying an incline and coöperating projection, with means whereby the movement of the incline is controlled by the gearing intermediate a gear segment and answer wheel.

17. In a calculating machine, the combination with the answer wheels, oscillatory gear segments for rotating said answer wheels, operating segments and means for locking the operating and gear segments together, of groups of keys for limiting the range of movement of the gear segments, zero stops for disconnecting the operating and gear segments when no key of a group is operated, and means controlled by each group of keys for displacing its zero stop when any key of the group is operated.

18. In a calculating machine, the combination with the answer wheels, oscillatory gear segments, operating arms therefor and oscillatory operating segments, of a latch for connecting the operating segments and arms, a dog controlling said latch, a group of keys with any one of which each dog is adapted to coöperate for releasing the latch, a transversely movable pivoted zero stop for coöperating with the dog of each arm when no key of the group is operated, a locking bar for each group of keys and coöperating inclines and projections intermediate the locking bars and zero stops, whereby upon the operation of any key of a group the zero stop is displaced transversely by the movement of the locking bar.

19. In a calculating machine, the combination with the answer wheels, oscillatory gear segments, operating arms, oscillatory operating segments, latches connecting the operating segments and arms, dogs controlling said latches, groups of keys with which the dogs coöperate to release the latches and lock the arms and gear segments, and locking bars for holding the operated key of any group depressed, of the zero stops for coöperating with the dogs, inclines on said zero stops, projections on the locking bars for displacing the zero stops upon the operation of any key of a group, latches for holding the zero stops in their displaced position, a pivoted frame for releasing said zero stops, and latches mounted in position to be displaced by the operating arms when returned to initial position.

20. In a calculating machine, the combination with the answer wheels, oscillatory gear segments, operating arms, operating segments, latches for connecting the operating arms and segments, dogs for releasing said latches, groups of keys for coöperating with the dogs to release the latches and lock the operating arms in the positions to which they have been moved by the operating segments, zero stops for coöperating with the dogs when no key of a group has been operated, locking bars for the keys, an incline and projection intermediate each locking bar and the corresponding zero stops, whereby upon the operation of a key of a group the zero stop will be displaced transversely and a catch for holding the zero stop in its displaced position, of a pivoted frame mounted in position to be displaced by the operating arms when in their initial position, a catch pivotally mounted on said frame for releasing the zero stop from its latch, and means mounted on said frame for releasing the latch during the movement of the frame to its initial position.

21. In a calculating machine, the combination with the answer wheels, gear segments, operating arms, operating segments, latches connecting the operating arms and segments, dogs controlling said latches, groups of keys with which said dogs coöperate, and longitudinally movable locking bars for holding any operated key of a group depressed, of means for releasing said locking bars, embodying a movable frame, coöperating projections on the frame and bars, a latch for depressing the frame and bars to release the keys, and a key controlled frame for holding said latch out of operative position whereby the machine may be operated a succession of times without resetting the keys.

22. In a calculating machine, the combination with the answer wheels, gear segments, operating arms, operating segments, latches connecting the operating arms and segments, dogs controlling said latches, groups of keys with which the dogs coöperate to lock the gear segments and release said latches, of a locking bar for each of the groups of keys, a movable frame having a transverse bar coöperating with all of the locking bars to move the same and release the operated keys, a pivoted frame with which the operating arms coöperate when in their initial position, a pivoted latch on said frame adapted to coöperate with the said transverse bar to depress the same and move the locking bars, and a key controlled bar for holding said latch out of operative position, whereby the release of the keys is prevented for repeating the operation of the machine without resetting the keys.

23. In a calculating machine, the combination with the answer wheels, gear segments for operating said wheels, oscillatory operating arms, latches intermediate said arms and gear segments and groups of keys, one group for each gear segment for positioning the operating arms and segments when operated, of a key controlled retainer for holding said latches out of operative position, whereby the operating arms may be actuated without actuating the gear segments, and recording mechanism actuated in unison with said operating arms, whereby a record may be made without actuating the answer wheels.

24. In a calculating machine, the combination with the answer wheels, gear segments for rotating said answer wheels, operating arms, oscillatory operating segments, latches connecting the operating arms and segments, groups of keys for releasing said latches and locking the arms in the positions to which they have been moved by the operating segments, and means for compelling a complete excursion of the operating segments, of printing segments, connections intermediate the printing segments and operating arms, whereby the printing segments are set and impression mechanism actuated by the operating segment when released from the operating arms, substantially as described.

25. In a calculating machine, the combination with the answer wheels, gear segments for rotating said answer wheels, operating arms, oscillatory operating segments, latches connecting the operating arms and operating segments, keys for releasing said latches and locking the arms in the position to which they have been moved by the operating segments, and means for compelling a complete excursion of the operating segments during each operation of the machine, of printing segments pivotally mounted on a resilient support, connections intermediate said printing segments and operating arms whereby the segments are positioned and a trip connection intermediate an operating segment and resilient support for the printing segments, the timing of the parts being such that said resilient support is put under tension during the forward movement of the operating segment and is released to make the impression by impact after the operating segments and arms are disconnected.

THOMAS IRVING POTTER.

Witnesses:
T. J. GLOVER,
ANNA RHINEMILLER.